UNITED STATES PATENT OFFICE.

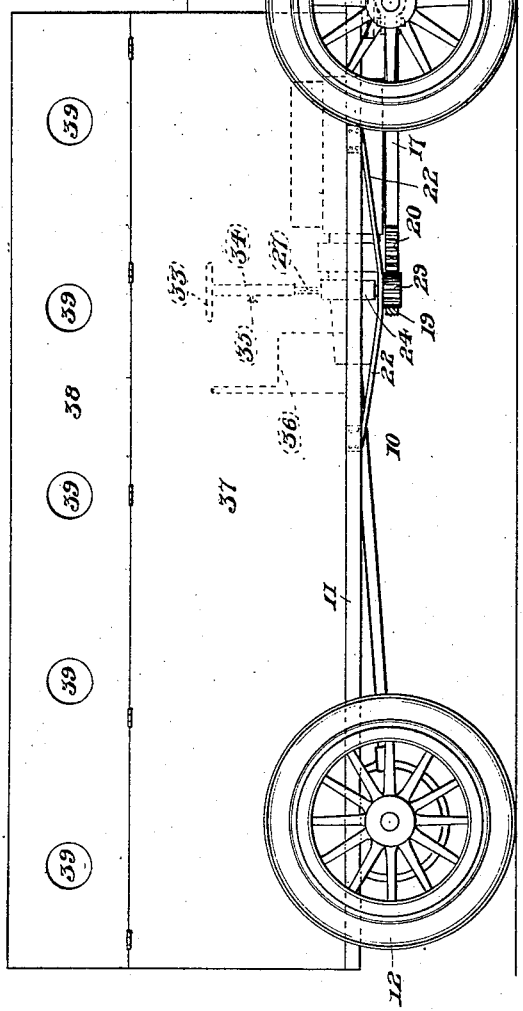

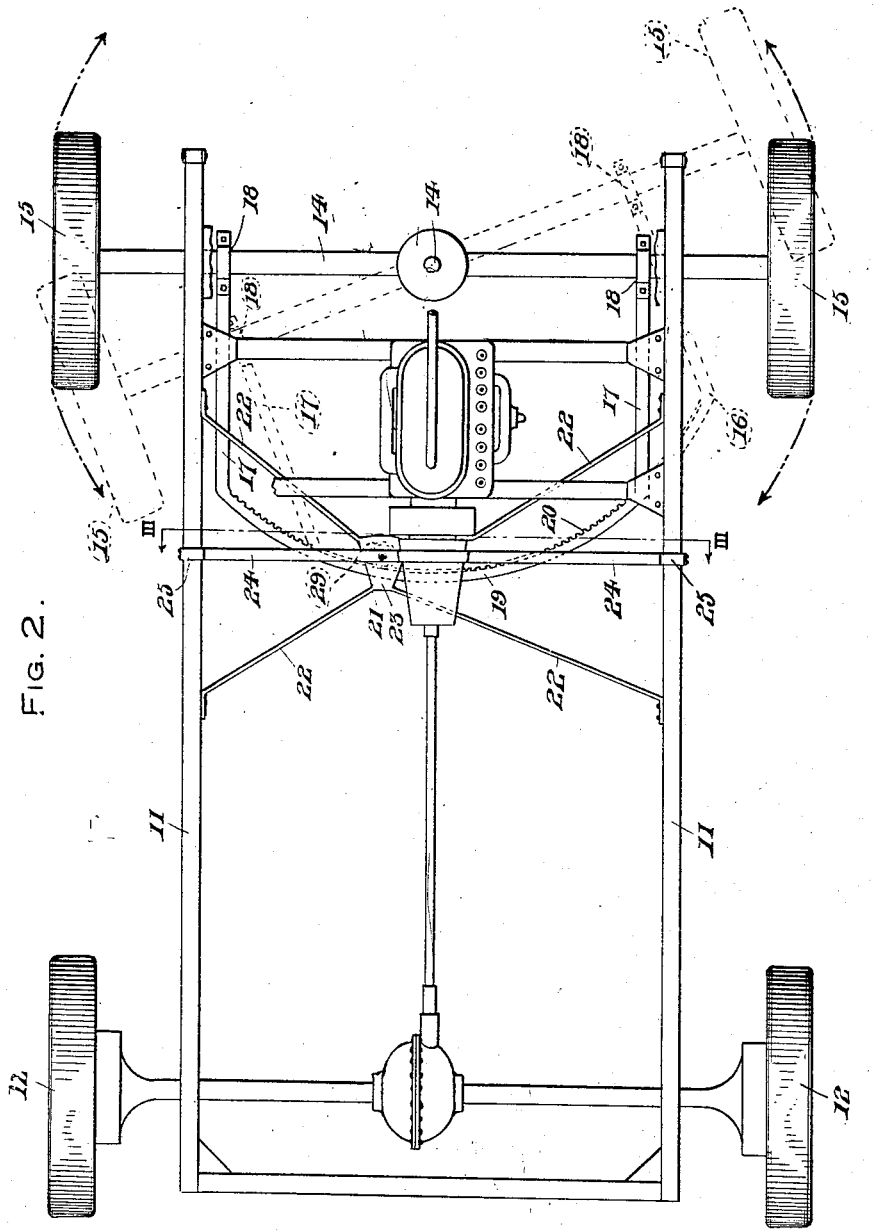

ANTONI JAGIEŁO, OF CLEVELAND, OHIO.

STEERING DEVICE FOR AUTOMOBILES.

1,284,693. Specification of Letters Patent. Patented Nov. 12, 1918.

Application filed March 4, 1918. Serial No. 220,306.

*To all whom it may concern:*

Be it known that I, ANTONI JAGIEŁO, a subject of the Emperor of Austria, residing at Cleveland, in the county of Cuyahoga and State of Ohio, have invented certain new and useful Improvements in Steering Devices for Automobiles, of which the following is a specification.

The primary object of the invention is the provision of a steering device for vehicles especially adapted for employment with heavy trucks such as armored automobiles for use in time of war, the structure possessing great strength and insuring the positive steering of the vehicle by the driver in charge of the same.

A further object of the invention is the provision of a steering means for automobile trucks adapted for ready attachment to a vehicle whenever desired and formed of few parts, readily renewable whereby the steering device may be easily maintained in operative condition until the vehicle wears out, the structure being such as to permit the vehicle to be readily steered as found desirable during the travel thereof.

In the drawings forming a part of this application and in which like numerals refer to corresponding parts throughout the several views:—

Figure 1 is a side elevation of an armored automobile provided with my device, parts being broken away;

Fig. 2 is a top plan view of the same with the body of the vehicle removed and portions indicated by dotted lines as positioned during the steering operation;

Fig. 3 is a vertical sectional detail view taken upon line III—III of Fig. 2;

Fig. 4 is an enlarged vertical detail sectional view of the steering connection taken upon line IV—IV of Fig. 5; and Fig. 5 is a horizontal sectional view taken upon line V—V of Fig. 4 with one of the members indicated by dotted lines.

Referring more in detail to the drawings, my steering mechanism is herein illustrated operatively assembled upon an armored automobile 10, which has a substantially rectangular frame 11, the usual rear traction wheels 12, and a forward axle 13, centrally pivoted as at 14, and having ground wheels 15 upon its opposite ends so that the automobile 10 may be readily steered by shifting the axle 13 upon its pivot 14 as illustrated by dotted lines in Fig. 2 of the drawings.

A substantially U-shaped frame 16 has its arms 17 detachably clamped as at 18 to the axle 13 and is provided with an arcuate rearwardly positioned connecting portion 19 having teeth 20 upon its forward face in the manner of a toothed rack. A spider 21 is located within the frame 11 being secured between the sides of the said frame 11 by having its legs 22 secured to the side rails and with the central portion plate 23 of the spider positioned centrally between the opposite sides of the vehicle frame.

A brace 24 extends transversely of the vehicle frame 11 and has its opposite ends secured as at 25 to the opposite side rails of the frame while a bushing 26 is journaled through the adjacent portions of the superposed brace 24 and plate 23. A squared steering post 27 extends through the squared opening 28 of the bushing 26 and carries a pinion 29 in constant mesh with the rack teeth 20, the lower end of the post 27 having a disk-shaped head 30 secured within a socket 31 upon the bottom face of the gear 29 by means of screws 32. A steering wheel 33 is adjustably mounted upon the post 27 by means of a sleeve 34 slidably carried by the said wheel and adapted for maintenance in its adjusted position at the desired elevation by means of a set-screw 35. A pin 40 extends through the post 27 and rests upon the top of bushing 26, for limiting the downward movement of the post and maintaining the gear 29 in connection with the teeth 20 of rack 19.

It will be readily seen that the driver of a vehicle positioned upon the seat 36 thereof may grasp the wheel 33 and by turning the same in the required direction will turn the gear 29 for shifting the rack 20 and the axle 13 in the desired direction for steering the automobile 10. A body 37 preferably formed of bullet-proof metal is provided for the automobile 10 having hinged upper portions 38 with portholes 39 therein through which the occupants of the vehicle may readily fire upon the enemy while in protected position within the body 37. If any portion of the steering gear, such as the rack 20, should become broken, the broken portion could be readily removed and a new piece substituted therefor.

What I claim as new is:

1. A vehicle including a frame having a pivotally mounted forward axle arranged with ground-engaging wheels, a spider secured transversely of the frame to the side rails thereof having a substantially centrally positioned plate, a transverse brace carried by the frame above said plate, a bushing vertically journaled through the said brace and plate, an arcuate rack detachably connected to the axle rearwardly thereof beneath said plate, a post arranged through said bushing adapted for turning therewith, and a gear upon the lower end of the post in constant mesh with said rack.

2. A vehicle including a frame having a pivotally mounted forward axle arranged with ground-engaging wheels, a spider secured transversely of the frame to the side rails thereof having a substantially centrally positioned plate, a transverse brace carried by the frame above said plate, a bushing vertically journaled through the said brace and plate, an arcuate rack detachably connected to the axle rearwardly thereof beneath said plate, a post arranged through said bushing adapted for turning therewith with a head upon its lower end, a gear secured to said post with a bottom socket having said head arranged therein, the said gear being in constant mesh with the said rack, and a hand wheel vertically adjustably mounted upon the said post.

3. In combination with a vehicle having a frame and a forward axle centrally pivoted beneath the forward end of the frame, a substantially U-shaped member detachably secured to the axle projecting rearwardly thereof with an arcuate toothed-connecting portion normally arranged substantially transverse beneath the vehicle, a spider transversely carried by the frame having a plate above the said arcuate toothed portion, a transverse brace on the frame arranged upon said plate, a vertical bushing journaled through said brace and plate, a gear contacting the bottom of said plate in constant mesh with said toothed portion and having a socket in its lower face, a steering post secured through said bushing and gear with a head at its lower end secured within said socket, and a hand wheel carried by the post.

In testimony whereof I affix my signature.

ANTONI JAGIEŁO.